(12) United States Patent
Johansson et al.

(10) Patent No.: US 9,311,749 B2
(45) Date of Patent: Apr. 12, 2016

(54) METHOD FOR FORMING AN OPTIMIZED POLYGON BASED SHELL MESH

(71) Applicant: DONYA LABS AB, Linköping (SE)

(72) Inventors: Gustaf Johansson, Stockholm (SE); Ulrik Lindahl, Ljungsbro (SE)

(73) Assignee: DONYA LABS AB, Linkoping (SE)

( * ) Notice: Subject to any disclaimer, the term of this patent is extended or adjusted under 35 U.S.C. 154(b) by 122 days.

(21) Appl. No.: 13/708,231

(22) Filed: Dec. 7, 2012

(65) Prior Publication Data

US 2014/0160121 A1    Jun. 12, 2014

(51) Int. Cl.
G06T 17/00 (2006.01)
G06T 15/00 (2011.01)
G06T 17/10 (2006.01)
G06T 15/40 (2011.01)
G06T 17/20 (2006.01)
G06T 19/20 (2011.01)

(52) U.S. Cl.
CPC .............. *G06T 17/10* (2013.01); *G06T 15/40* (2013.01); *G06T 17/20* (2013.01); *G06T 19/20* (2013.01); *G06T 2210/12* (2013.01); *G06T 2219/2016* (2013.01)

(58) Field of Classification Search
CPC ............................... G06T 17/20; G06T 15/20
USPC .................................. 345/418–420
See application file for complete search history.

(56) References Cited

U.S. PATENT DOCUMENTS

| | | |
|---|---|---|
| 5,590,248 A | 12/1996 | Zarge et al. |
| 5,929,860 A | 7/1999 | Hoppe |
| 6,198,486 B1 | 3/2001 | Junkins et al. |
| 6,362,820 B1 * | 3/2002 | Hoppe .......................... 345/423 |
| 6,424,351 B1 | 7/2002 | Bishop et al. |
| 6,587,104 B1 | 7/2003 | Hoppe |
| 6,765,574 B1 | 7/2004 | Mao et al. |
| 6,771,261 B2 | 8/2004 | MacPherson |
| 2002/0163515 A1 | 11/2002 | Sowizral et al. |
| 2003/0011637 A1 | 1/2003 | Boudier |
| 2003/0063086 A1 * | 4/2003 | Baumberg ................... 345/420 |
| 2003/0065668 A1 | 4/2003 | Sowizral et al. |
| 2003/0151604 A1 | 8/2003 | Kaufman et al. |
| 2005/0099420 A1 | 5/2005 | Hoppe |
| 2006/0284880 A1 | 12/2006 | Zhou et al. |
| 2007/0080960 A1 | 4/2007 | Dayanand et al. |

(Continued)

FOREIGN PATENT DOCUMENTS

WO    WO 2007/100298    9/2007

OTHER PUBLICATIONS

Cohen, Jonathan et al. "Simplification Envelopes." Computer Graphics Proceedings 1996; New Orleans, LA, Aug. 4-9, 1996: pp. 119-128.

(Continued)

*Primary Examiner* — Phi Hoang
*Assistant Examiner* — Yi Yang
(74) *Attorney, Agent, or Firm* — Hanress, Dickey & Pierce, P.L.C.

(57) ABSTRACT

The present invention relates to a computer implemented method for controlling an image processing apparatus configured for forming an optimized polygon based shell mesh for a three-dimensional graphics image. The present invention also relates to a corresponding image processing apparatus and a computer program product.

17 Claims, 3 Drawing Sheets

(56) References Cited

U.S. PATENT DOCUMENTS

| | | | |
|---|---|---|---|
| 2007/0268291 A1 | 11/2007 | Naoi | |
| 2008/0204447 A1* | 8/2008 | Amsterdam et al. | 345/419 |
| 2010/0026682 A1 | 2/2010 | Plowman et al. | |
| 2010/0060630 A1 | 3/2010 | Nystad et al. | |
| 2010/0277476 A1* | 11/2010 | Johansson et al. | 345/423 |
| 2011/0292037 A1* | 12/2011 | Lu | 345/419 |
| 2012/0104286 A1* | 5/2012 | Yashima et al. | 250/492.22 |
| 2012/0229445 A1* | 9/2012 | Jenkins | 345/418 |
| 2013/0127890 A1* | 5/2013 | DiVerdi et al. | 345/582 |

OTHER PUBLICATIONS

Law, Fei-Ah and Tiow-Seng Tan. "Preprocessing Occlusion for Real-Time Selective Refinement." Proceedings of the 1999 Symposium on Interactive 3D Graphics; Atlanta, GA, Apr. 26-28, 1999: pp. 47-53.

Süss, Tim et al. "Approximative Occlusion Culling Using the Hull Tree." Graphics Interface Conference 2011; St. John's, Newfoundland, Canada, May 25, 2011: pp. 79-85.

International Search Report and Written Opinion dated Mar. 27, 2014 issued in corresponding International Application No. PCT/EP2013/075662.

Diaz-Calderon, Antonio, et al. "Combining Information Technology Components and Symbolic Equation Manipulation in Modeling and Simulation of Mechatronic Systems" Institute for Software Research, Paper 527, pp. 1-8, (1999).

El-Sana, Jihad, et al. "Generalized View-Dependent Simplification" Eurographics, vol. 18, No. 3, pp. 1-13, (1999).

Hoppe, Hugues, et al. "Mesh Optimization" University of Washington, pp. 1-8, (1993).

\* cited by examiner

METHOD FOR FORMING AN OPTIMIZED POLYGON BASED SHELL MESH

TECHNICAL FIELD

The present invention generally relates to computer graphics and more specifically to a computer implemented method for forming an optimized polygon based shell mesh for a three-dimensional graphics image. The present invention also relates to a corresponding image processing apparatus and a computer program product.

BACKGROUND OF THE INVENTION

The creation and interactive visualization of artificial computer graphics (CG) environments is an important application in the field of computer graphics. Many applications, such as CAD, architectural walkthroughs, simulations, medical visualization and computer games include interactive navigation, i.e., being able to move around a computer model/scene at greater than 10 frames per second.

A common trend within the field of interactive computer graphics is the increasing amount of CG datasets. Large CG datasets require specialized graphics systems used to accelerate the process. However, models exist that cannot be rendered at interactive speeds even with current high-end computer hardware. The development of computer hardware is not likely to solve the described problems since the size of the CG data and the size of the secondary computer memory is increasing at faster rates than the development of thereto related hardware.

CG data is often represented using triangle meshes, or even more generally using a plurality of polygons. These meshes are typically not optimized for display or simulation performance. In most applications, the initial meshes can usually be replaced by optimized versions that could be approximations with far fewer faces, or containing other properties that make them more suited for particular applications such as mentioned above.

To prevent a decrease in calculation speed, an automatic technique of creating three-dimensional GC data with a small number of triangles/polygons in advance is often employed. However, even after using such techniques, there are often still too many polygons for today's hardware to render. The problem is that scenes, such as in a computer game, often have very high depth complexity, that is, many layers of geometry underneath each pixel.

For example, a visual image that includes a large scene of a computer game, such as a building interior, a city, mountain, and the like, may involve millions of polygons that need to be drawn. Drawing such a large number of polygons may be a task that is beyond the capacity of many of today's computer hardware systems. One solution to this problem recognizes that usually only a small part of such a scene is actually visible. That is, many of the polygons that comprise the scene may be hidden or occluded by other polygons, or even too far from the viewpoint to be fully recognized.

For such a purpose and specifically in regards to complex polygon structures, there is a normal trend to manually create simplified structures resembling the complex polygon structure but introducing a lower computational cost for use in the determination process in relation to polygon occlusion (often referred to as occlusion culling). By such a process, it is possible to further improve rendering of the scene.

However, manual creation of the above mentioned simplified structures is a tedious process and slows down as well as increases the cost when e.g. producing a computer game or similar. In addition, the quality of the resulting simplified polygon structure is limited by skill of the graphics artist creating the polygon structure. Accordingly, it would be desirable to allow for automation of the forming an optimized polygon based shell mesh for a three-dimensional graphics image, possibly being useful in an occlusion culling process.

SUMMARY OF THE INVENTION

According to a first aspect of the invention, the above is at least partly alleviated by a computer implemented method for forming an optimized polygon based shell mesh for a three-dimensional graphics image, the method comprising obtaining the three-dimensional graphics image, the three-dimensional graphics image represented as an initial polygon mesh, determining a three-dimensional profile of the initial polygon mesh, resizing the polygon mesh a predetermined amount along a normal to the three-dimensional profile of the initial polygon mesh, the resized polygon mesh having a three-dimensional profile being larger than or smaller than the three-dimensional profile of the initial polygon mesh, if the three-dimensional profile of the resized polygon mesh is larger than the three-dimensional profile of the initial polygon mesh, forming the optimized shell mesh by adjusting the three-dimensional profile of the resized polygon mesh using a polygon optimization process, wherein the optimized shell mesh encloses a predetermined majority of the three-dimensional profile for the initial polygon mesh, or if the three-dimensional profile of the resized polygon mesh is smaller than the three-dimensional profile of the initial polygon mesh, forming the shell mesh by adjusting the three-dimensional profile of the resized polygon mesh using a polygon optimization process, wherein a predetermined majority of the shell mesh is enclosed by the three-dimensional profile for the initial polygon mesh.

By means of the invention, it is possible to automate the formation of a polygon based shell mesh for a three-dimensional graphics image. The main advantage with the invention is that it is possible to guarantee the resulting shell mesh to have a predetermined limitation in regards to its initial three-dimensional profile, i.e. typically being either larger than or smaller than (at least at some points) the three-dimensional profile of the initial three-dimensional graphics image.

By being able to guarantee such a result to be within a predetermined range (i.e. that a predetermined majority of the shell mesh either is enclosed or encloses the initial polygon mesh), the resulting shell mesh may be specifically useful in e.g. an occlusion culling process.

According to the invention, the expression resizing the polygon mesh a predetermined amount along a normal to the three-dimensional profile of the initial polygon mesh should be understood to essentially correspond to, if resizing the polygon mesh "inward", "pealing" off a predetermined amount of the outer layer of the polygon mesh. If resizing the polygon mesh "outwards", the opposite action is performed, i.e. "adding" a further layer outside of the polygon mesh. This process provides the later polygon optimization process to further improve its optimization as the polygon optimization process is given a "span" in which the optimization process may be performed. Furthermore, the expression "polygon optimization process" should be interpreted broadly. That is, according to the invention the resulting shell mesh is arranged to comprise a lower number of polygons as compared to the polygon mesh of the initial three-dimensional graphics image. Accordingly, the term "optimized" may be dependent on e.g. user constraints set for performing the polygon reduction process.

As briefly discussed above, occlusion culling is a feature that disables rendering of objects when they are not currently seen from a specific view-point because they are obscured by other objects. According to the inventive method, in an occlusion culling process a shell mesh being larger than the three-dimensional profile of the initial three-dimensional graphics image may be provided as an "occludee", whereas a shell mesh being smaller than the three-dimensional profile of the initial three-dimensional graphics image may be provided as an "occluder". As understood, the occluder is provided for "hiding" the occludee.

However, it should be noted that the resulting shell mesh also may be useful e.g. in relation to physics-based simulations and calculations.

In addition, by means of the possibility of guaranteeing, up to a predetermined degree, that the shell mesh is either larger than or smaller than the three-dimensional profile of the initial three-dimensional graphics image, it may be possible to also guarantee that a three-dimensional graphics image represented by an occludee formed according to the invention in fact will be hidden (up to a predetermined degree depending on the above mentioned "slack") behind a three-dimensional graphics image represented by an occluder also formed according to the invention.

As understood, the inventive method is generally fairly conservative in relation to the resulting shell mesh. That is, the resulting shell mesh is either larger than or smaller than the initial polygon mesh. Hence, it may be suitable to allow for at least some slack in relation to the resulting shell mesh. Accordingly, even though a majority of the resulting shell mesh is either larger than or smaller than the initial polygon mesh, a predetermined portion (possibly 5-15%) of the resulting shell mesh may therefore be "inside of" or "outside of" (depending on if larger than or smaller than) the three-dimensional profile of the initial three-dimensional graphics image. The amount of slack may be adapted dynamically by e.g. a user controlling a computer for performing the inventive method, i.e. determining with what "grace" the resulting shell mesh should be determined in relation to the initial polygon mesh. Allowing for the above discussed slack may allow for the polygon optimization process to be further improved as to the possibility of reducing the number of polygons in the resulting shell mesh.

Alternatively, the optimized shell mesh may be arranged to enclose the entire three-dimensional profile for the initial polygon mesh. Similarly, the shell mesh may be arranged to be entirely enclosed by the three-dimensional profile for the initial polygon mesh.

It should within the context of the present invention be understood that the determining of the three-dimensional profile of the initial polygon mesh typically may remove any cavities on the surface of the initial three-dimensional graphics image, as the three-dimensional profile may be seen as a "view-independent silhouette" as seen by an outside observer. That is, the three-dimensional profile shall be interpreted as a silhouette seen from all sides of the initial three-dimensional graphics image. In forming an occludee, the silhouette reduction may only optionally be performed.

Furthermore, it should be noted that the resizing may be performed equally over the (entire) initial three-dimensional image. However, it may be necessary, depending on the type of initial three-dimensional image, to limit the resizing such that self-intersection takes does not take place. The resizing may also be view-dependent as well as object dependent, such that different types of object and/or seen from different views may depend upon the predetermined amount of resizing taking place.

Within the context of the invention, the concept of performing a polygon optimization process typically includes forming a "simplified" shell mesh where the number of polygons are adequately reduced (i.e. using any automated polygon reduction process as is known in the art) for simplifying the shell mesh in such a manner that using the resulting shell mesh in an intermediate rendering/determination process will be advantageous from a computational perspective in comparison to performing the rendering/determination using the initial polygon mesh. Further, the process of forming shell mesh is typically performed for a high resolution three-dimensional graphical image (e.g. an "asset" in a computer game) but may advantageously also be used in relation to three-dimensional images being somewhat polygon reduced (i.e. an LOD).

In addition, it may be preferred to also introduce an "inner boundary" inside of which the polygon optimization process may be performed. The inner boundary may for example be determined in a similar manner as when resizing the polygon mesh a predetermined amount along a normal (inwards) to the three-dimensional profile of the initial polygon mesh. Possibly, the inner boundary may be set a predetermined amount (further) inwards from the three-dimensional profile as in regards to the resized polygon mesh.

According to another aspect of the present invention there is provided an image processing apparatus for forming an optimized polygon based shell mesh for a three-dimensional graphics image, comprising means for obtaining the three-dimensional graphics image, the three-dimensional graphics image represented as an initial polygon mesh, means for determining a three-dimensional profile of the initial polygon mesh, means for resizing the polygon mesh a predetermined amount along a normal to the three-dimensional profile of the initial polygon mesh, the resized polygon mesh having a three-dimensional profile being larger than or smaller than the three-dimensional profile of the initial polygon mesh, means for forming the optimized shell mesh, configured to if the three-dimensional profile of the resized polygon mesh is larger than the three-dimensional profile of the initial polygon mesh, adjusting the three-dimensional profile of the resized polygon mesh using a polygon optimization process, wherein a predetermined majority of the optimized shell mesh encloses the three-dimensional profile for the initial polygon mesh, or if the three-dimensional profile of the resized polygon mesh is smaller than the three-dimensional profile of the initial polygon mesh, adjusting the three-dimensional profile of the resized polygon mesh using a polygon optimization process, wherein a predetermined majority of the shell mesh is enclosed by the three-dimensional profile for the initial polygon mesh. This aspect of the invention provides similar advantages as discussed above.

The invention is preferably provided on a computer-readable storage medium storing a program which causes a computer to execute an image processing method as discussed above.

According to further aspect of the invention there is provided a computer program product comprising a computer readable medium having stored thereon computer program means for controlling an image processing apparatus configured for controlling an image processing apparatus configured for forming an optimized polygon based shell mesh for a three-dimensional graphics image, wherein the computer program product comprises code for obtaining the three-dimensional graphics image, the three-dimensional graphics image represented as an initial polygon mesh, code for determining a three-dimensional profile of the initial polygon mesh, code for resizing the polygon mesh, the resized polygon mesh having a three-dimensional profile being larger than or smaller than the three-dimensional profile of the initial polygon mesh, code for forming the optimized shell mesh, the code being configured to if the three-dimensional profile of the resized polygon mesh is larger than the three-dimensional profile of the initial polygon mesh, adjusting the three-dimensional profile of the resized polygon mesh using a polygon optimization process, wherein a predetermined majority of the optimized shell mesh encloses the three-dimensional profile for the initial polygon mesh, or if the three-dimensional profile of the resized polygon mesh is smaller than the three-dimensional profile of the initial polygon mesh, adjusting the three-dimensional profile of the resized polygon mesh using a polygon optimization process, wherein a predetermined majority of the shell mesh is enclosed by the three-dimensional profile for the initial polygon mesh. This aspect of the invention provides similar advantages as discussed above.

The image processing apparatus is preferably a server, a general computer, a micro processor or any other type of computing device. Similarly, the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee should realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

In a system with a three-dimensional graphics accelerator, an application program generates three-dimensional geometry data including information corresponding to points on the surface of a three-dimensional graphical image. These points are usable as vertices of polygons which, when connected, may be rendered to form a representation of the graphical image. Typically, the application program transfers the three-dimensional geometry data to a graphics accelerator and renders the encoded polygons on e.g. a computer screen.

Figure 1:
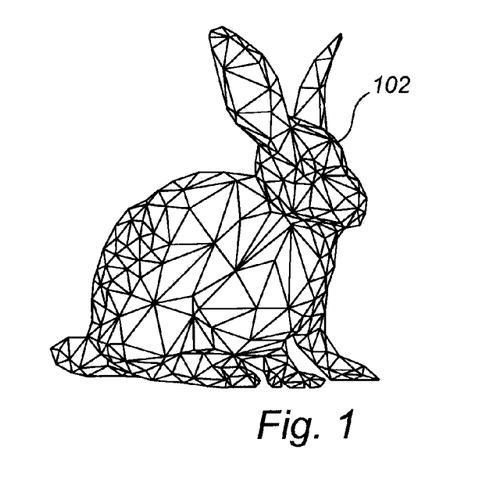
FIG. 1 shows an example of polygon based three-dimensional graphics image.

The process of connecting three-dimensional vertices to form a representation of a graphical image may be referred to as creating a polygon mesh. FIG. 1 illustrates an exemplary three-dimensional graphics image, in the form of a "bunny", which have been tiled into such a polygon mesh. The bunny 102 is here represented by a large plurality of polygons.

As discussed above, the present invention generally relates to a computer implemented method for forming an optimized polygon based shell mesh for a three-dimensional graphics image. The general concept of the present invention may typically be implemented in an image processing apparatus including a general purpose processor (e.g. a user controlled personal computer), an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 2:
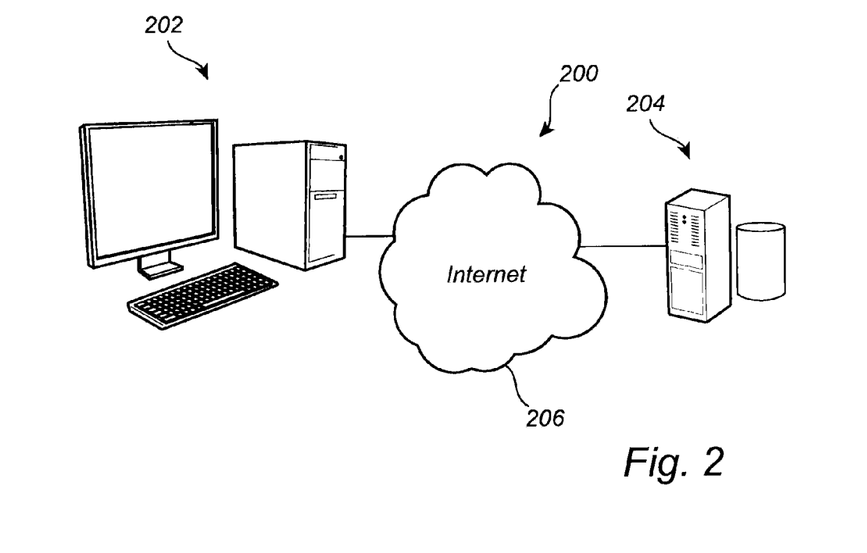
FIG. 2 illustrates a conceptual image processing system according to a currently preferred embodiment of the invention.

However, as is shown in the conceptual illustration provided in FIG. 2, the general functionality of the inventive image processing apparatus may also and/or alternatively be provided in a distributed environment, for example by means of an image processing system 200. In such an implementation, the image processing system 200 may be configured to comprise a user controlled computing device 202 (e.g. the user controlled personal computer) connected to a server/database arrangement 204 over the Internet 206. Accordingly, resources for performing the inventive concept may typically be divided between the computing device 202 and the server/database arrangement 204.

Further to reducing the hardware constrains on the user controlled computing device 202, it would according to the invention be possible to e.g. "on-demand" provide a user/customer with the functionality provided by means of the inventive concept. As an example, a user wanting to generate a polygon reduced image based on an original three-dimensional graphics image may, through a user interface shown on the computing device 202, access a computer implementation of the optimizing polygon reduction running on the server 204. Alternatively, the computing device 202 may be provided with software for producing the original image (such as for example 3D Studio Max, Maya, etc.), where the software running on the computing device 202 is adapted to access/interact with (by means of e.g. an API and "on-demand", as a subscription, as a fixed service, etc.) a computer implementation of the inventive concept running on the server 204.

Figure 3:
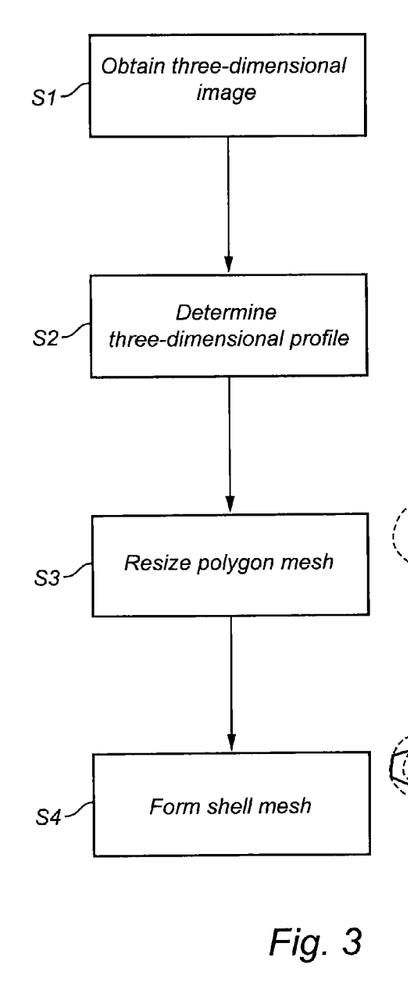
FIG. 3 shows a flow chart of method steps according to an embodiment of the invention.
Figure 4:
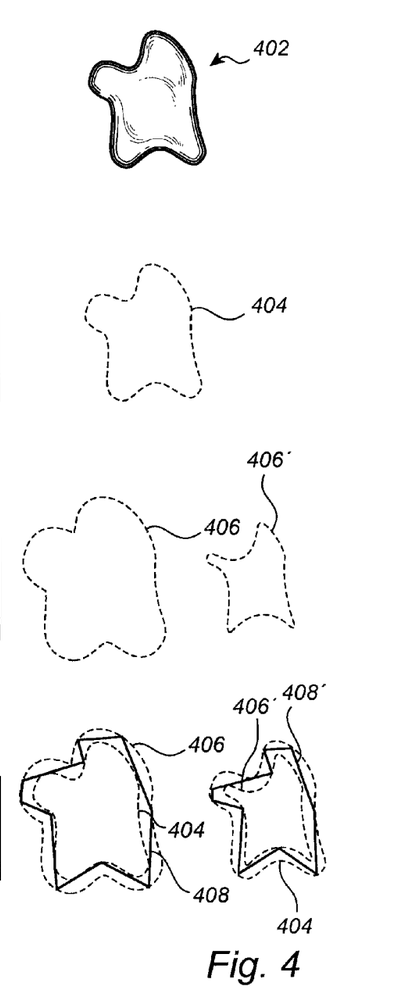
FIG. 4 provides intermediate visualizations of the graphics objects generated at different processes of the inventive method.

In performing the inventive concept, with further reference to FIGS. 3 and 4, the process starts with a image processing apparatus, e.g. in the form of the combined image processing system 200 controlled by the user of the computing device 202, obtains, S1, the three-dimensional graphics image 402, the three-dimensional graphics image 402 represented as an initial polygon mesh seen from a single distinct view (as shown in the top of FIG. 4). The process continues by determining, S2, a three-dimensional profile 404 of the initial polygon mesh, and resizing, S3, the polygon mesh a predetermined amount along a normal to the three-dimensional profile of the initial polygon mesh, the resized polygon mesh having a three-dimensional profile being larger 406 than or smaller than 406' the three-dimensional profile of the initial polygon mesh.

In case the three-dimensional profile of the resized polygon mesh 406 is larger than the three-dimensional profile of the initial polygon mesh 404 the process is continued by forming, S4, the optimized shell mesh 408, by adjusting the three-dimensional profile of the resized polygon mesh 406 using a polygon optimization process as discussed above, wherein the optimized shell mesh 408 encloses the three-dimensional profile for the initial polygon mesh 404.

Alternatively, if the three-dimensional profile of the resized polygon mesh 406' is smaller than the three-dimensional profile of the initial polygon mesh 404, the process is instead continued by forming the shell mesh 408' by adjusting the three-dimensional profile of the resized polygon mesh 406' using a polygon optimization process (possibly the same or alternatively a different polygon optimization/reduction process), wherein the shell mesh 408' is enclosed by the three-dimensional profile for the initial polygon mesh.

The process as is illustrated in FIG. 4 is conceptually provided for a single view of a three-dimensional image. However, it should be understood that the inventive process is typically provided for all views of the three-dimensional image.

Figure 5A:
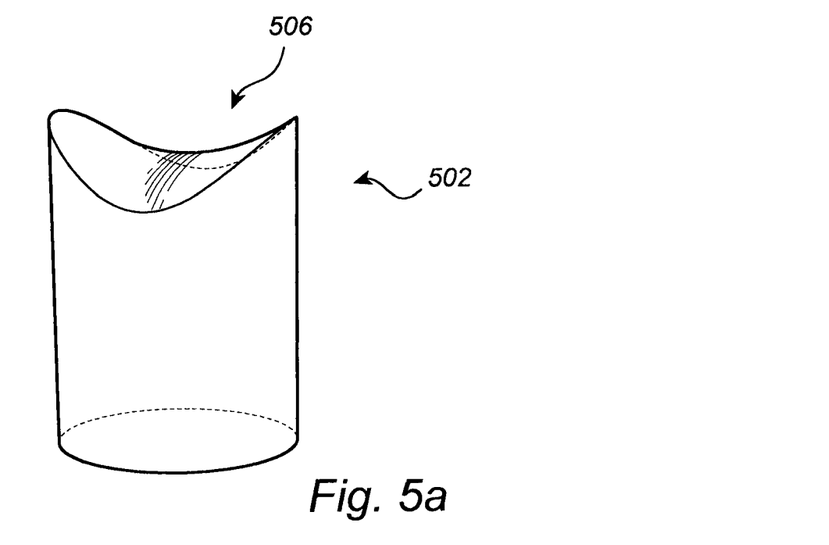
FIGS. 5a and 5b illustrates exemplary images in relation to the concept of cavity reduction.
Figure 5B:
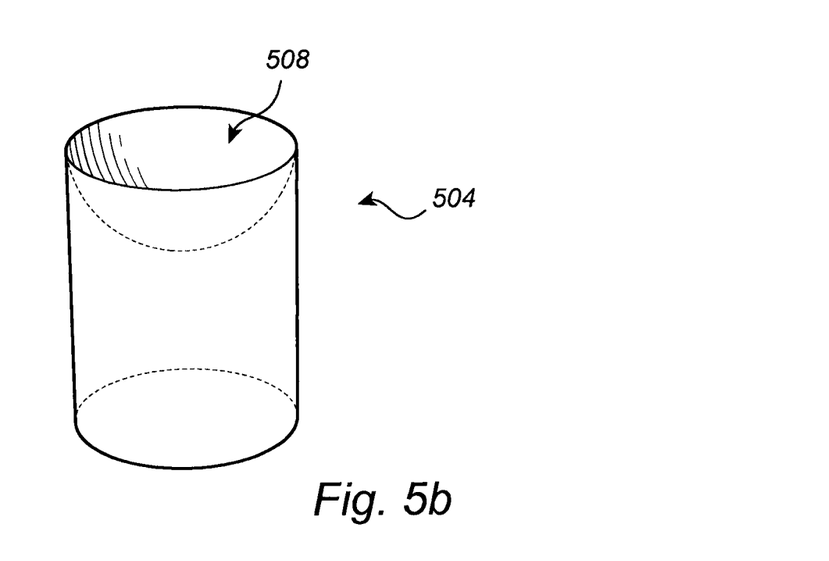

Turning now to FIGS. 5a and 5b, conceptually illustrating two examples of when the concept of cavity reduction will have impact in relation to e.g. determination of the three-dimensional profile of the initial polygon mesh. As can be seen from FIG. 5a, it is clear that the object 502 at least from some directions/in some views, a cavity 506 will indeed be visible. Hence, a cavity reduction/elimination will typically not be suitable as the actual cavity will allow e.g. a further object arranged "behind" the object 502 could be seen in relation to the cavity 506. Accordingly, the cavity reduction will be view-dependent and based on the silhouette as seen from a specific view.

However, in relation to the object 504, the cavity 508 will on the other hand not have any impact on e.g. a further object behind the object 504. Accordingly, in regards to the object 504 and the cavity 508, a cavity reduction/elimination may be possible allowing for further polygon reductions in relation to the resulting shell mesh.

In summary, the present invention relates to a computer implemented method for forming an optimized polygon based shell mesh for a three-dimensional graphics image. By means of the invention, it is possible to automate the formation of a polygon based shell mesh for a three-dimensional graphics image. The main advantage with the invention is that it is possible to guarantee the resulting shell mesh to have a predetermined limitation in regards to its initial three-dimensional profile, i.e. typically being either larger than or smaller than (at least at some points) the three-dimensional profile of the initial three-dimensional graphics image.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for forming an optimized, polygon based mesh for a three-dimensional graphics image, to be used as an occluder mesh and an occludee mesh in a visual simulation, the method comprising:
   obtaining, by a processor, the three-dimensional graphics image, the three-dimensional graphics image represented as an initial polygon mesh;
   determining, by the processor, a three-dimensional profile of the initial polygon mesh by determining a view independent silhouette of the initial polygon mesh;
   resizing, by the processor, the initial polygon mesh a predetermined amount along a line normal to the three-dimensional profile of the initial polygon mesh, so as to form a first resized polygon mesh having a three-dimensional profile that is a predetermined amount larger than the three-dimensional profile of the initial polygon mesh;

forming, by the processor, the occludee mesh by adjusting the three-dimensional profile of the first resized polygon mesh using a polygon optimization process such that the occludee mesh encloses a desired majority of the three-dimensional profile of the initial polygon mesh, wherein the occludee mesh comprises fewer polygons than the initial polygon mesh;

using the occludee mesh to determine polygon visibility within a scene to be displayed;

resizing, by the processor, the initial polygon mesh a predetermined amount along a line normal to the three-dimensional profile of the initial polygon mesh, so as to form a second resized polygon mesh having a three-dimensional profile that is a predetermined amount smaller than the three-dimensional profile of the initial polygon mesh;

forming, by the processor, the occluder mesh by adjusting the three-dimensional profile of the second resized polygon mesh using a polygon optimization process such that a desired majority of the occluder mesh is enclosed by the three-dimensional profile of the initial polygon mesh, wherein the occluder mesh comprises fewer polygons than the initial polygon mesh; and using the occluder mesh to determine polygon visibility within the scene to be displayed.

2. The method according to claim 1, wherein the occludee mesh encloses the entire three-dimensional profile for the initial polygon mesh.

3. The method according to claim 1, wherein the occluder mesh is entirely enclosed by the three-dimensional profile for the initial polygon mesh.

4. The method according to claim 1, wherein a volume of the first or second resized polygon mesh is view-independently larger than or smaller than a volume of the initial polygon mesh.

5. The method according to claim 1, wherein the occludee mesh encloses the entire outer boundary of, the initial polygon mesh and is larger than or equal to the three-dimensional profile of the initial polygon mesh.

6. The method according to claim 1, wherein the occluder mesh is enclosed by the entire outer boundary of the initial polygon mesh and is smaller than or equal to the three-dimensional profile of the initial polygon mesh.

7. The method according to claim 1, further comprising:
providing the occluder mesh that is enclosed by the three-dimensional profile of the initial polygon mesh as an object in a physics based simulation/calculation.

8. The method according to claim 1, wherein 5-15% of the occludee mesh is inside of the three-dimensional profile of the initial polygon mesh if the desired majority of the occludee mesh encloses the three-dimensional profile of the initial polygon mesh.

9. The method according to claim 1, wherein 5-15% of the occluder mesh is outside of the three-dimensional profile of the initial polygon mesh if the desired majority of the occluder mesh is enclosed by the three-dimensional profile of the initial polygon mesh.

10. An image processing apparatus for forming an optimized polygon based mesh for a three-dimensional graphics image, to be used as an occluder mesh and an occludee mesh in a visual simulation, comprising:
a processor configured to, obtain the three-dimensional graphics image, the three-dimensional graphics image represented as an initial polygon mesh, determine a three-dimensional profile of the initial polygon mesh by determining a view independent silhouette of the initial polygon mesh, resize the initial polygon mesh a predetermined amount along a line normal to the three-dimensional profile of the initial polygon mesh, so as to form a first resized polygon mesh having a three-dimensional profile that is a predetermined amount larger than the three-dimensional profile of the initial polygon mesh, form the occludee mesh by adjusting the three-dimensional profile of the first resized polygon mesh using a polygon optimization process such that a desired majority of the occludee mesh encloses the three-dimensional profile of the initial polygon mesh, wherein the occludee mesh comprises fewer polygons than the initial polygon mesh, use the occludee mesh to determine polygon visibility within a scene to be displayed, resize the initial polygon mesh a predetermined amount along a line normal to the three-dimensional profile of the initial polygon mesh, so as to form a second resized polygon mesh having a three-dimensional profile that is a predetermined amount smaller than the three-dimensional profile of the initial polygon mesh, form the occluder mesh by adjusting the three-dimensional profile of the second resized polygon mesh using a polygon optimization process such that a desired majority of the occluder mesh is enclosed by the three-dimensional profile of the initial polygon mesh, wherein the occluder mesh comprises fewer polygons than the initial polygon mesh, and use the occluder mesh to determine polygon visibility within the scene to be displayed.

11. The image processing apparatus according to claim 10, wherein the occludee mesh encloses the entire three-dimensional profile for the initial polygon mesh.

12. The image processing apparatus according to claim 10, wherein the occluder mesh is entirely enclosed by the three-dimensional profile for the initial polygon mesh.

13. The image processing apparatus according to claim 10, wherein a volume of the first and second resized polygon mesh is view-independently larger than or smaller than a volume of the initial polygon mesh.

14. The image processing apparatus according to claim 10, wherein the occludee mesh encloses the entire outer boundary of the initial polygon mesh and is larger than or equal to the three-dimensional profile of the initial polygon mesh.

15. The image processing apparatus according to claim 10, wherein the occluder mesh is enclosed by the entire outer boundary for the initial polygon mesh and is smaller than or equal to the three-dimensional profile of the initial polygon mesh.

16. A non-transitory computer-readable storage medium storing a program which causes a computer to execute the image processing method of claim 1.

17. A computer product comprising a non-transitory computer readable medium having stored thereon a computer program product for controlling an image processing apparatus configured for forming an occluder mesh and an occludee mesh for a three-dimensional graphics image, wherein, when executed, the computer program product causes the image processing apparatus to perform operations comprising:

obtaining the three-dimensional graphics image, the three-dimensional graphics image represented as an initial polygon mesh;

determining a three-dimensional profile of the initial polygon mesh by determining a view independent silhouette of the initial polygon mesh;

resizing the initial polygon mesh a predetermined amount along a line normal to the three-dimensional profile of the initial polygon mesh, so as to form a first resized polygon mesh having a three-dimensional profile that is larger than the three-dimensional profile of the initial polygon mesh;

forming the occludee mesh by adjusting the three-dimensional profile of the first resized polygon mesh using a polygon optimization process such that a desired majority of the occludee mesh encloses the three-dimensional profile of the initial polygon mesh, wherein the occludee mesh comprises fewer polygons than the initial polygon mesh;

using the occludee mesh to determine polygon visibility within a scene to be displayed;

resizing the initial polygon mesh a predetermined amount along a line normal to the three-dimensional profile of the initial polygon mesh, so as to form a second resized polygon mesh having a three-dimensional profile that is a predetermined amount smaller than the three-dimensional profile of the initial polygon mesh;

forming the occluder mesh by adjusting the three-dimensional profile of the second resized polygon mesh using a polygon optimization process such that a desired majority of the occluder mesh is enclosed by the three-dimensional profile of the initial polygon mesh, wherein the occluder mesh comprises fewer polygons than the initial polygon mesh; and using the occluder mesh to determine polygon visibility within the scene to be displayed.

\* \* \* \* \*